United States Patent
Lanne et al.

(10) Patent No.: US 7,277,648 B2
(45) Date of Patent: Oct. 2, 2007

(54) NETWORK ELEMENT FOR USE IN AN OPTICAL COMMUNICATION NETWORK, IN PARTICULAR A DWDM COMMUNICATION NETWORK

(75) Inventors: Stéphanie Lanne, Paris (FR); Denis Penninckx, Nozay (FR); Olivier Audouin, Longjumeau (FR); Yann Frignac, Paris (FR)

(73) Assignee: Alcatel, Paris (FR)

( * ) Notice: Subject to any disclaimer, the term of this patent is extended or adjusted under 35 U.S.C. 154(b) by 576 days.

(21) Appl. No.: 10/824,484

(22) Filed: Apr. 15, 2004

(65) Prior Publication Data
US 2004/0223766 A1 Nov. 11, 2004

(30) Foreign Application Priority Data
May 5, 2003 (EP) ............................ 03360055

(51) Int. Cl.
*H04B 10/08* (2006.01)
*H04B 10/00* (2006.01)
*H04B 10/04* (2006.01)
*H04J 14/00* (2006.01)
*H04J 14/02* (2006.01)

(52) U.S. Cl. .................. 398/198; 398/33; 398/48; 398/57; 398/93; 398/158

(58) Field of Classification Search ................ 398/183, 398/5, 7, 13, 14, 17, 20, 25–28, 33, 34, 37, 398/38, 45, 48–51, 57, 91, 93, 158, 185, 398/192, 198
See application file for complete search history.

(56) References Cited

U.S. PATENT DOCUMENTS 5,524,144 A * 6/1996 Suzuki ..................... 398/181
5,946,119 A * 8/1999 Bergano et al. ............... 398/91
6,256,127 B1 7/2001 Taylor
6,285,681 B1 9/2001 Kolze et al.
6,307,986 B1 10/2001 Duerksen et al.
6,574,018 B1 * 6/2003 Handelman ................. 398/49
2002/0106148 A1 8/2002 Schemmann et al.

FOREIGN PATENT DOCUMENTS

EP 0 806 852 A2 11/1997
WO WO 02/37720 A2 5/2002

OTHER PUBLICATIONS

Bakhshi et al., Comparision of CRZ, RZ and NRZ modulation formats in a 64×12.3 Gb/s WDM transmission experiment over 9000 km. Optical Society of America 2001.*
G. Charlet et al et al, "6.4Tb/s (159×42.7GB/s) Capacity Over 21×100 km Using Bandwidth-Limited Phase shaped Binary Transmission" ECOC.

* cited by examiner

Primary Examiner—Dalzid Singh
(74) Attorney, Agent, or Firm—Sughrue Mion, PLLC

(57) ABSTRACT

The present invention relates to an optical communication network and to a network element for use in such a network. The network element comprises a plurality of receivers (70-76) for receiving optical communication signals, a plurality of transmitters (54-62, 82-86) for transmitting optical communication signals, and a plurality of network connections, each network connection having an individual signal impairment characteristic. The pluralities of receivers (70-76) and transmitters (54-62, 82-86) are adapted to employ a plurality of different modulation schemes (64, 66). Furthermore, the pluralities of receivers (70-76) and transmitters (54-62, 82-86) are assigned to the network connections as a function of the individual signal impairment characteristics.

19 Claims, 1 Drawing Sheet

US 7,277,648 B2

NETWORK ELEMENT FOR USE IN AN OPTICAL COMMUNICATION NETWORK, IN PARTICULAR A DWDM COMMUNICATION NETWORK

BACKGROUND OF THE INVENTION

The invention is based on a priority application EP03360055.2 which is hereby incorporated by reference.

The present invention relates to a network element for use in an optical communication network and in particular to a network element for use in a DWDM communication network.

The invention further relates to an optical communication network comprising corresponding network elements.

Optical communication networks and in particular DWDM (Dense Wavelength Division Multiplex) communication networks are basically known. For instance, U.S. Pat. No. 6,307,986 B1 discloses an approach for protection switching in bidirectional WDM optical communication networks using transponders. The background portion of this document provides a general overview of such kind of networks and refers to further background literature.

A basic idea of a DWDM communication network is to transmit a plurality of optical communication signals across a common optical fiber by using wavelength division multiplexing. This means that the plurality of messages to be transmitted is modulated onto a plurality of optical carrier wavelengths thereby providing wavelength separated communication channels for each message.

The modulation process may be carried out using various modulation techniques and parameters. Each of the various alternatives is referred to as a modulation scheme in the following. The modulation schemes may comprise different modulation formats, such as Amplitude Shift Keying with Return-to-Zero signals (RZ), Amplitude Shift Keying with Non-Return-to-Zero (NRZ), Phase Shift Keying and in particular Differential Phase Shift Keying (DPSK), Phase-Shaped Binary Transmission (PSBT), and others. The modulation schemes may further comprise different modulation techniques, such as direct modulation of a laser source or external modulation of a continuous light beam provided from a light source. Likewise, the optical network may be designed to communicate message signals with a specific bit rate in all the communication channels.

As it is known to the skilled person in the field of optical communication technology, optical signals propagating along an optical fiber suffer from a plurality of different signal impairments, in particular from chromatic dispersion, polarization mode dispersion, scattering and others. Since these signal impairments become more severe the longer the spans between an optical transmitter and an optical receiver is, it is difficult to scale up an existing optical communication network designed for covering short or medium distances to long haul or ultra-long haul hops. Moreover, since the signal impairments are also dependent on the wavelength used, it is also difficult to add or switch to new wavelengths in an existing concept.

Previous approaches to cope with the increasing problems of signal impairments in long distance optical networks have envisaged the introduction of dispersion compensation devices, preferably adaptive compensation devices. While it is basically possible to increase the signal quality transmitted over long distance hops, such compensation devices are rather expensive thereby increasing the costs of the overall network concept. Additionally, there may be circumstances where such adaptive compensation devices introduce instabilities in the network.

On the other hand, it is known to those skilled in the art that different modulation schemes, and in particular different modulation formats, might be differently affected by the signal impairments. In other words, a PSBT transmission, for instance, is more robust against dispersion than NRZ, for instance. A successful approach using PSBT is disclosed, for instance, by Charlet et al., "Capacity over 21×100 km Using Bandwidth-Limited Phase-Shaped Binary Transmission", ECOC'02. Likewise, a RZ modulation format is interestingly robust against polarization mode dispersion, cf. Khosravani et al., "Comparison of Different Modulation Formats in Terrestrial Systems with High Polarization Mode Dispersion", OFC'00, WL5.

SUMMARY OF THE INVENTION

In view of the above, it is an object of the present invention to provide a network element that facilitates an inexpensive design and installation of an optical communication network, in particular a transparent optical communication network using DWDM.

According to one aspect of the invention, this object is achieved by a network element comprising:

a plurality of receivers for receiving optical communication signals, a plurality of transmitters for transmitting optical communication signals, and a plurality of network connections, each network connection having an individual signal impairment characteristic, wherein the pluralities of receivers and transmitters employ a plurality of different modulation schemes, and wherein the pluralities of receivers and transmitters are assigned to the network connections as a function of the individual signal impairment characteristics.

According to another particular aspect of the invention, this object is achieved by using such a network element for upgrading an existing design of an optical communication network in terms of distances allowed between network elements of the network.

According to yet another aspect of the invention, this object is achieved by a method of communicating messages within an optical communication network, in particular a DWDM communication network, the method comprising the steps of:

providing a message which is to be transmitted from a source network element to a destination network element, modulating an optical carrier signal with the message in the source network element, and transmitting the modulated carrier signal across a network connection to the destination network element, wherein the step of modulating comprises a first sub-step of determining an individual signal impairment characteristic of the network connection, and a second sub-step of selecting a modulation scheme from a plurality of different modulation schemes as a function of the individual signal impairment characteristic determined.

The new network element and the new method exploit the idea of providing a plurality of different modulation schemes, and more preferably a plurality of different modulation formats, with a suitable modulation scheme being selected depending on the signal impairment characteristics of the network connection available. In other words, for a network connection likely to be suffering from chromatic dispersion, for instance, a modulation scheme which is more robust against chromatic dispersion might be selected, while RZ or even NRZ might be used for other connections. The network element is therefore capable of switching between different modulation schemes depending on the individual network connection to be used.

Since the various modulation schemes, and in particular the various modulation formats, are differently susceptible against various signal impairments associated with various network connections, the communication quality in the overall network can be increased without using expensive adaptive compensators for various signal impairments.

In particular, using different modulation schemes as a function of the network connection facilitates to build up an inexpensive optical communication network having an inhomogeneous structure of network connections due to different hop lengths between transmitter and receiver, for instance. Dispensing with adaptive compensators in such a scenario further provides the advantage of avoiding instabilities within the network, which might occur otherwise.

Transmitters and receivers for various modulation schemes are already available as standard devices in DWDM technology. It is therefore a rather inexpensive approach to combine these devices into the new network element rather than developing and implementing adaptive compensation devices as envisaged as an alternative approach. Moreover, use of such network elements provides an inexpensive approach to upgrade an existing short haul or medium haul network to long or ultra-long haul hops. For the short distances, modulation schemes already employed in the existing network might be maintained in use, while the added long or ultra-long haul hops are served with more suitable new modulation schemes.

All in all, the new network element and the corresponding method provide a less expensive approach for establishing an optical communication network suffering from various signal impairments. Thus, the above object is completely achieved.

In a refinement of the invention, the network element further comprises a multiplexer adapted to multiplex optical communication signals from the plurality of transmitters employing different modulation schemes onto a signal optical output fiber.

Likewise preferred, the network element further comprises a demultiplexer adapted to demultiplex optical communication signals from a single optical input fiber to the plurality of receivers employing different modulation schemes.

With these refinements, the new approach is extended to the idea of distributing the optical spectral bandwidth available on an optical fiber to different modulation schemes. This refinement even further contributes to an inexpensive network design, because a single optical fiber can be used in a more efficient manner without the need of expensive compensation devices. For instance, due to a non optimum transfer characteristic of an amplifier arranged in an optical fiber, some communication channels of a DWDM signal might suffer more from signal impairments than others. Combining channels with different modulation schemes into the same fiber provides an inexpensive approach to cope with this scenario. It is even possible to use less expensive amplifiers within the fiber link, which further contributes to reduced costs.

In a further refinement, the network element comprises a light path provisioning unit configured to select one from the plurality of transmitters for a signal to be transmitted as a function of an impairment parameter corresponding to a desired network connection.

This refinement provides an increased flexibility, because the light path through the network element might be changed by changing or providing an appropriate parameter. The corresponding network element can thus be adapted to various operation conditions more easily.

In a preferred refinement, the impairment parameter is a distance from the network element to a target node. Accordingly, it is a preferred refinement of the new method, if the modulation scheme is selected depending on the distance that the optical communication signal has to travel.

This refinement is particularly useful in systems employing optical Add-Drop-Multiplexers (OADM), which facilitate removal or addition of an optical communication signal from and into the DWDM multiplex signal, respectively. Since the distance is a parameter that can be easily determined, this refinement provides a very simple and thus inexpensive approach to implement the new idea.

In a further refinement, the plurality of modulation schemes comprises at least some of the following modulation formats: NRZ, RZ, PSBT, and DPSK.

It has turned out that these various modulation formats are particularly useful in order to cope with different signal impairment characteristics in existing network concepts. While NRZ, for instance, is a rather inexpensive approach, it is more susceptible against chromatic dispersion than PSBT, for instance. DPSK has turned out to be very suitable for coping with non-linear effects, but it requires a slightly more complex demodulator. Combining at least some of the above-mentioned modulation formats provides very good results for the overall network.

In a further refinement, the plurality of modulation schemes comprises direct modulation and external modulation of the optical signals to be transmitted.

This refinement again contributes to decreasing the costs, because direct modulation is less expensive than external modulation. However, external modulation is capable of providing a higher signal quality. Exploiting these different modulation schemes allows to establish less expensive communication links, where affordable, and higher signal quality links, where desired. This refinement is again particularly useful, if the corresponding modulation schemes are combined onto a single fiber, although not all of the above-mentioned modulation formats can be achieved with less expensive direct modulation.

In a further refinement, the plurality of modulation schemes comprises a plurality of different carrier wavelengths for modulation.

Of course, it is an inherent characteristic of a DWDM system to use different carrier wavelengths in the modulation process for separating the communication channels. In the context of the present invention, however, the different carrier wavelengths are selected as a function of the signal impairment characteristics, i.e. a specific message might be modulated on either this carrier wavelength or that carrier wavelength depending on the signal impairment characteristics determined. This feature is particularly useful in order to compensate for signal impairments varying with time or operating condition.

In a further refinement, the plurality of modulation schemes comprises a plurality of different bit rates.

Again, transmission of signals having different bit rates is generally known per se. In the context of the present invention, however, this feature means that the bit rate is selected in accordance with the signal impairment characteristic determined. This refinement is again particularly useful in order to compensate for time varying or otherwise varying impairment conditions.

It goes without saying that the features mentioned above and those yet to be explained in the following may be used not only in the respectively stated combination, but also in other combinations or on their own, without departing from the scope of the present invention.

BRIEF DESCRIPTION OF THE DRAWINGS

The invention will now be described in more detail with reference to the drawings, in which:

In FIG. 1, reference numeral 10 designates a simplified optical communication network, which is a DWDM communication network preferably. However, the skilled person will recognize that the invention is not restricted to DWDM communication networks as such, but can be applied to other optical communication networks providing a plurality of network connections.

Figure 1:
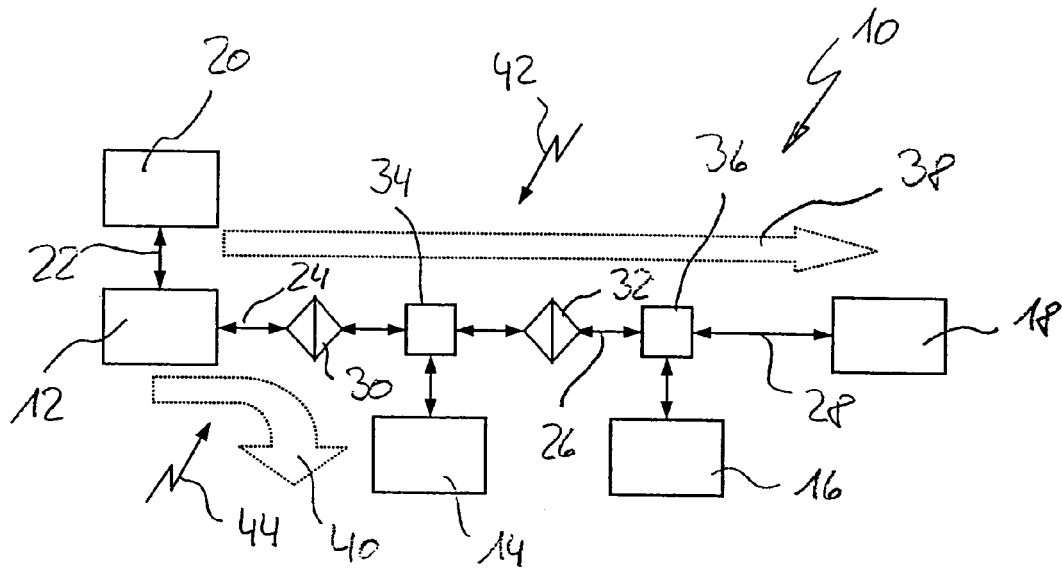
FIG. 1 shows a simplified (partial) block diagram of a new communication network.

The network 10 comprises a plurality of network elements which are designated by reference numerals 12, 14, 16, 18 and 20. The network elements are connected by optical fiber links 22, 24, 26, 28. In particular, elements 12 and 20 are connected by a direct fiber link 22. Elements 12 and 14 are connected by a further fiber link 24 comprising an optical amplifier 30, which might be an erbium-doped fiber amplifier (EDFA), for instance. A similar amplifier 32 is arranged in fiber link 26, which is connected to fiber link 24 by means of an optical Add-Drop-Multiplexer (OADM). Element 14 is also connected to OADM 34.

Likewise, a second OADM 36 is connected to the other end of fiber link 26, and it further connects to a fiber link 28 and to element 16. Finally, fiber link 28 terminates at element 18 in this simplified and exemplary embodiment.

For sake of clarity, fiber links 22-28 are shown here "in a simple line". However, the skilled person will readily appreciate that these fiber links typically include two separate fibers, one for each direction of transmission (back and forth)

Reference numerals 38 and 40 indicate two exemplary network connections. Network connection 38 illustrates a connection for a communication between element 12 and element 18 across fiber links 24, 26, and 28 including optical amplifiers 30, 32 and OADM 34, 36. Network connection 40 illustrates a communication between element 12 and element 14 across fiber link 24 including optical amplifier 30 and OADM 34. The two exemplary network connections might suffer from individual and different signal impairment characteristics, which are illustrated as arrows designated by reference numerals 42 and 44.

Figure 2:
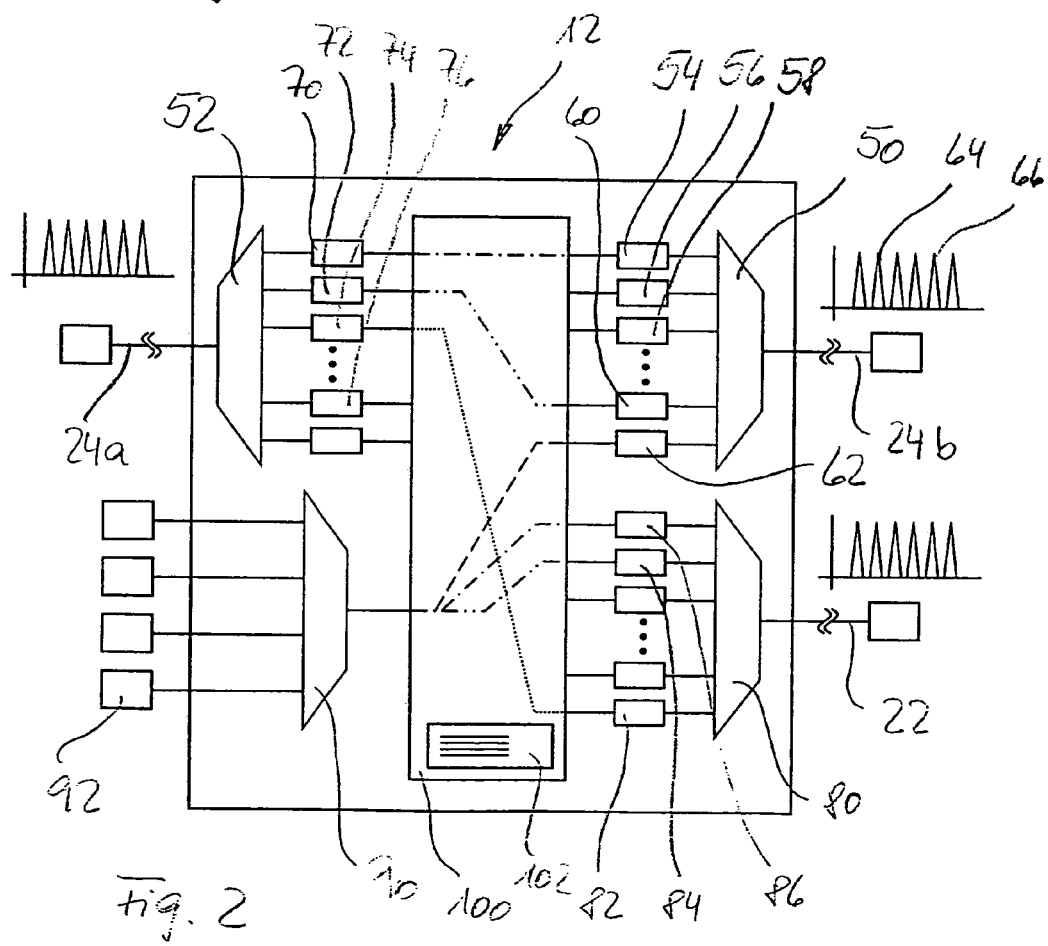
FIG. 2 shows a simplified block diagram of a network element in the communication network of FIG. 1.

In FIG. 2, network element 12 is schematically shown in a simplified block diagram. The network element 12, which is also referred to as node 12 here, comprises several implementations of the invention for illustrative purposes. It should be understood, however, that not all of the implementations described in the following are required in specific embodiments.

Network element 12 comprises a (first) multiplexer 50 and a demultiplexer 52. Multiplexer 50 is connected to a fiber 24a for transmitting optical communication signals across fiber link 24. Demultiplexer 52 is likewise connected to a fiber 24b for receiving optical communication signals across fiber link 24. Multiplexer 50 is further connected to a plurality of transmitters, which are designated by reference numerals 54, 56, 58, 60, 62. Transmitters 54-62 employ a plurality of modulation schemes. For instance, transmitter 54 (and further transmitters not specifically shown here for sake of clarity) might be implemented as NRZ transmitters, transmitter 56 (and further transmitters) might be implemented as RZ transmitters, transmitter 58 (and further transmitters) might be implemented as PSBT transmitter, and transmitter 60 (and further transmitters) might be implemented as DPSK transmitter. It goes without saying that transmitters 54-62 are implemented to operate with different carrier wavelengths such that multiplexer 50 is capable of multiplexing the output signals of transmitters 54-62 having individual and different modulation schemes onto the single output fiber 24b. A simplified illustration of the multiplexed output signal having channels with different modulation schemes 64, 66 is shown at the output of multiplexer 50.

Furthermore, demultiplexer 52 is connected to a plurality of receivers 70, 72, 74, 76, which likewise comprise receivers for NRZ, RZ, PSBT, and DPSK. According to a preferred embodiment, receivers 70, 72, 74 are multi standard receivers capable of demodulating NRZ, RZ and PSBT, while receiver 76 (and further receivers not shown here for sake of clarity) is a specific receiver for DPSK.

Optical fiber link 22 is likewise connected to a (second) multiplexer 80 connected to a plurality of various transmitters 82, 84, 86.

For illustrative purposes, network element 12 further comprises a third multiplexer 90 multiplexing incoming message signals from a plurality of message sources for further transmission.

Finally, network element 12 comprises a light path provisioning unit designated by reference numeral 100, which unit comprises a memory 102 adapted to store parameters corresponding to the impairment characteristics of the network connections available. In a preferred embodiment, the network parameters might comprise a distance information associated with the respective network connections.

According to one aspect of the invention, a source message signal to be transmitted might be distributed by the light path provisioning unit 100 to one from the plurality of transmitters 54-62, 82-86. Depending on the selected transmitter, the source message signal will be modulated with an individual modulating scheme and transmitted accordingly. The modulating scheme and thus the respective transmitter is selected as a function of the signal impairment characteristic determined from memory 102, for instance.

In order to illustrate different impairment characteristics, network connections 38 and 40 of FIG. 1 might be considered. While the signals traveling along network connection 38 have to pass several optical amplifiers 30, 32 and several OADM 34, 36, the optical signals traveling along network connection 40 only have to pass optical amplifier 30 and OADM 34. Thus, the respective optical signals are affected differently and in accordance with their destination. Since the distance between elements 12 and 18 is longer than the distance between elements 12 and 14, it is most likely that the optical signals traveling along network connection 38 are more severely impaired by chromatic and polarization mode dispersion than the signals traveling along network connection 40. Accordingly, it is preferred to select a more robust modulation scheme for the signals traveling along network connection 38 than for the signals on network connection 40.

Additionally, it might be the case that the quality of the signal transmission between elements 12 and 16 needs to be better (higher) than the quality of the transmission between elements 12 and 14. Therefore, optical channels intended to travel to element 16 might be processed with an external modulation, while optical signals traveling to element 14 might be modulated with less expensive direct modulation.

Likewise, bit rates and/or carrier wavelengths might be selected in accordance with optimum transmission characteristics.

The new approach allows to deal with poor transmission conditions in the network without adding new amplifiers or expensive compensating devices. Thus, it is proposed an inexpensive approach to improve and upgrade existing optical networks.

The invention claimed is:

1. A network element for use in an optical communication network, in particular a dense wavelength division multiplex (DWDM) communication network, the network element comprising:
   a plurality of receivers for receiving optical communication signals,
   a plurality of transmitters for transmitting optical communication signals,
   a plurality of network connections, each network connection having an individual signal impairment characteristic, and
   a memory that stores a parameter corresponding to said individual signal impairment characteristic,
   wherein the pluralities of receivers and transmitters employ a plurality of different modulation formats, and
   wherein the pluralities of receivers and transmitters are assigned to the network connections as a function of the individual signal impairment characteristics, as determined by said stored parameter.

2. The network element of claim 1, further comprising a multiplexer adapted to multiplex optical communication signals from the plurality of transmitters employing different modulation formats onto a single optical output fiber.

3. The network element of claim 1, further comprising a demultiplexer adapted to demultiplex optical communication signals from a single optical input fiber to the plurality of receivers employing different modulation formats.

4. The network element of claim 1, further comprising a lightpath provisioning unit configured to select one from the plurality of transmitters for a signal to be transmitted as a function of the impairment parameter corresponding to a desired network connection.

5. The network element of claim 4, wherein the impairment parameter is a distance from the network element to a target node.

6. The network element of claim 1, wherein the plurality of modulation formats comprises direct modulation and external modulation of the optical communication signals to be transmitted.

7. The network element of claim 1, wherein the plurality of receivers and transmitters employ a plurality of different carrier wavelengths for modulation.

8. The network element of claim 1, wherein the plurality of receivers and transmitters employ a plurality of different bit rates.

9. An optical communication network comprising a plurality of nodes connected by a plurality of network connections, wherein at least some of the nodes comprise a network element as defined in claim 1.

10. A use of a network element as defined in claim 1 for upgrading an optical communication network in terms of distances allowed between network elements.

11. A method of communicating messages within an optical communication network, in particular a dense wavelength division multiplex (DWDM) communication network, the method comprising the steps of:
    providing a message which is to be transmitted from a source network element to a destination network element,
    modulating an optical carrier signal with the message in the source network element, and
    transmitting the modulated carrier signal across a network connection to the destination network element,
    storing a parameter corresponding to said individual signal impairment characteristic in a memory,
    wherein the step of modulating comprises a first sub-step of determining an individual signal impairment characteristic of the network connection, and a second sub-step of selecting a modulation format from a plurality of different modulation formats as a function of the individual signal impairment characteristic determined by said parameter.

12. The method of claim 11, further comprising multiplexing optical communication signals from a plurality of transmitters employing different modulation formats onto a single optical output fiber.

13. The method of claim 12, further comprising demultiplexing optical communication signals from a single optical input fiber to a plurality of receivers employing said different modulation formats.

14. The method of claim 12, further comprising selecting one from the plurality of transmitters for a signal to be transmitted as a function of the impairment parameter corresponding to a desired network connection.

15. The method of claim 14, wherein the impairment parameter is a distance from the source network element to a target network element.

16. The method of claim 11, wherein the plurality of modulation formats comprises direct modulation and external modulation of the optical communication signals to be transmitted.

17. The method of claim 11, wherein a plurality of different carrier wavelengths are employed for modulation.

18. The method of claim 11, wherein a plurality of different bit rates are employed for modulation.

19. The method of claim 11, further comprising upgrading an optical communication network in terms of distances allowed between network elements.

* * * * *